United States Patent [19]

Hoover

[11] 4,156,264
[45] May 22, 1979

[54] HIGH POWER PROTECTION APPARATUS

[75] Inventor: Merle V. Hoover, Flemington, N.J.

[73] Assignee: RCA Corporation, New York, N.Y.

[21] Appl. No.: 823,335

[22] Filed: Aug. 10, 1977

[51] Int. Cl.² .................... H02H 3/20; H02H 7/20
[52] U.S. Cl. .................... 361/56; 315/123; 315/125; 328/8; 361/55; 361/91
[58] Field of Search .............. 361/56, 55, 54, 57, 361/91, 1, 21; 328/8, 10; 315/91, 123, 125, 127, 195, 349, 308, 310, 306; 307/100

[56] References Cited

U.S. PATENT DOCUMENTS

| | | | |
|---|---|---|---|
| 2,575,232 | 11/1951 | Parker et al. | 328/8 X |
| 2,928,026 | 3/1960 | Hoover | 315/125 |
| 3,084,284 | 4/1963 | Schultz, Sr. et al. | 315/125 X |
| 3,601,657 | 8/1971 | Guarino | 361/56 |
| 3,916,252 | 10/1975 | Gould, Jr. | 328/8 X |
| 4,054,933 | 10/1977 | Praeg | 361/57 |

Primary Examiner—Patrick R. Salce
Attorney, Agent, or Firm—Samuel Cohen; William Squire

[57] ABSTRACT

Protection apparatus responsive to a fault condition in a high voltage, high current device to be protected; includes an ignitron and a hydrogen thyratron, connected in parallel across the device under protection, such that in event of a fault in the protected device, current is tandemly shunted away from the faulting device. Both the hydrogen thyratron and the ignitron receive simultaneous triggering signals from a fault-detection circuit upon the occurrence of a fault in the device under protection. Since the hydrogen thyratron responds to the fault-trigger signal more rapidly than the ignitron, it establishes a current-shunting path in the first fraction of a microsecond until such time as the slower-responding ignitron can become conductive and carry the brunt of the current to be shunted away from the faulting protected device.

3 Claims, 2 Drawing Figures

HIGH POWER PROTECTION APPARATUS

The present invention relates to apparatus for the protection of devices powered by high voltage, high current energy sources. Ignitrons are known in the art as current-shunting protective devices in event of faults in systems employing high voltages and/or high currents. For example, in U.S. Pat. No. 2,575,232 a circuit is disclosed employing an ignitron to protect the high-power tube (and/or circuitry) in radio transmitter apparatus operating from a power supply in the order of several thousand volts. The ignitor electrode of the ignitron is connected to receive a firing voltage from a fault detection circuit for triggering the ignitron in the presence of a fault condition, e.g., the development of over-current due to a flash-arc fault within the high-power radio-frequency generator vacuum tube. In U.S. Pat. No. 3,601,657 an ignitron is disclosed as a means of protecting a magnetohydrodynamic (MHD) generator. This generator normally has an output voltage in the range of up to 6 thousand volts, but in event of a fault condition, the voltage may suddenly rise to a magnitude of about 60 thousand volts and damage the apparatus. In this example, the ignitron is used to "clamp" the generator output bus so that damaging over-voltage cannot develop under fault conditions. Subsequent to current-conduction by the ignitron, a solenoid-driven switch is actuated and closed to assist the ignitron in carrying the short circuit current under faulting conditions. The solenoid-driven switch, however, operates at a considerably slower speed than the ignitron.

Thyratrons are also known as current-shunting protective devices in electronic fault-protection systems. For example, in U.S. Pat. No. 2,815,446 a circuit is disclosed to divert supply-current from a high power electron tube in event of a flash-arc fault within the tube. Since the thyratron is a simple hot-cathode device, electrons are immediately available to initiate current-flow upon application of an appropriate signal to its control grid. Hence, in general, its speed of conductive-response is comparatively more rapid than that of the complex high-voltage mercury-pool ignitron. On the other hand, since the thyratron is a hot-cathode device, its long-term current-handling capability is generally a restriction when compared with an ignitron. Furthermore, the thyratron is by nature of its construction inherently more electrically-fragile than the electrically-rugged ignitron. In summary, the thyratron (and the hydrogen-filled thyratron in particular) is generally preferred as a current-shunting device in high-speed, high-voltage fault-protection systems if the total energy to be shunted is within its comparatively modest capabilities. The ignitron, however, is particularly suited for use as a current-shunting device in super-power fault-protection systems.

Currently, there are systems under design and development in which many megajoules of stored energy (e.g., in capacitor banks) are required for normal operation. In event of a fault in the normal load of such a system (or its power-controlling device), an immense reservoir of stored energy is immediately available to quickly "feed the fault" and seriously damage the faulting device (or circuit). It is therefore, a prime necessity that the presence of a fault condition must be quickly detected and appropriate current-diverting means must become functional at the earliest possible instant in order to minimize the possibility of permanent damage to the faulting device (or circuit). Furthermore, the current-diverting means must be capable of performing this protective function without itself being damaged. Certain of the super-power electronic switching systems currently under development (e.g., for use in controlling the neutral beam injection to a nuclear fusion reactor) require the storage of energy at potentials in the order of 200 kilovolts, with a capability of supplying several thousand amperes of current for a period in the order of a second. In systems of this size, serious damage to a faulting device or circuit can be inflicted in a comparatively few microseconds as a consequence of the over-current flow during the faulting condition. An apparatus embodying the present invention protects such super-power systems against damage due to over-current flow or over-voltage under fault conditions.

Figure 1:
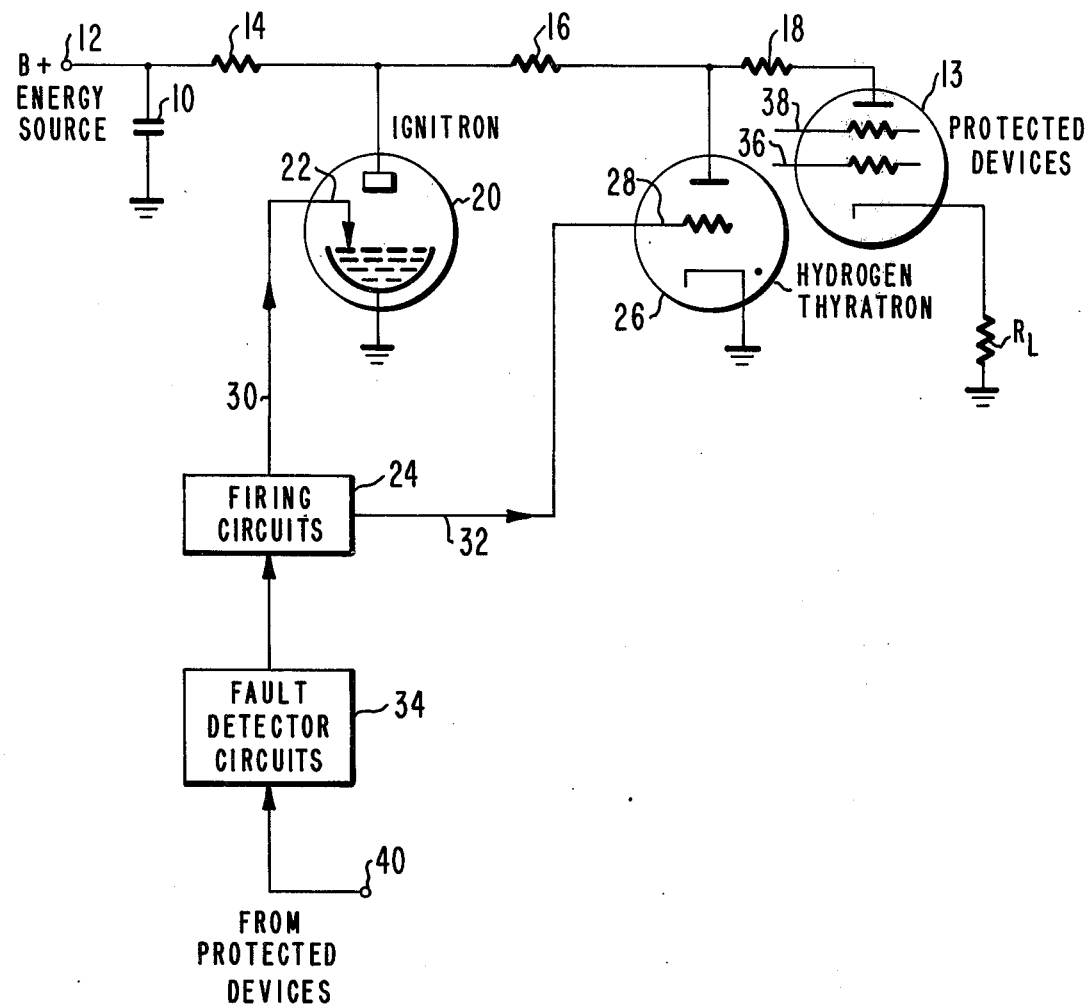
FIG. 1 is a circuit schematic illustrating one embodiment of the invention.

In FIG. 1, a B+ terminal 12 is used to maintain the charge on an energy source 10 (shown as a capacitor). The energy source 10 is serially connected to the protected device 13 (and load device 15) through three current limiting resistances 14, 16 and 18. It is to be understood that device 13 to be protected also has a ground terminal (not shown) to provide a return path to the energy source 10.

Ignitron 20 has its anode connected to the junction of resistances 14 and 16. Its cathode is connected to ground. Ignitor electrode 22 is connected to suitable firing circuits 24. Such firing circuits are disclosed in U.S. Pat. No. 2,575,232 by way of example.

Connected to the junction of resistances 16 and 18 is the anode of hydrogen thyratron 26. The cathode of thyratron 26 is connected to ground. Thyratron triggering electrode 28 is connected to the firing circuits 24.

The firing circuits 24 produce a triggering signal simultaneously at outputs 30 and 32. The triggering signal at output 30 triggers the ignitron 20 and the trigger signal at output 32 triggers hydrogen thyratron 26. Both the ignitron 20 and the thyratron 26 are triggered simultaneously. Fault circuits 34 in response to a fault signal at terminal 40 from the devices 13 and 15 triggers firing circuits 24. The fault signal results when a fault occurs in devices 13 or 15.

The thyratron 26 has a fractional microsecond response after receiving an appropriate trigger signal at electrode 28, thereby permitting it to quickly begin diverting supply-current (at the junction of resistances 16 and 18) from the protected devices 13 and 15. Although the hydrogen thyratron is fast-acting, its inherent physical characteristics do not permit it to safely carry the high diverted current-flow for a period sufficient to fully charge the large energy source capacitor 10. Meanwhile, however, sufficient time (e.g., 5 to 10 microseconds) has elapsed so that the mercury-pool ignitron can become fully conductive and begin its current-diverting function (from the junction of resistances 14 and 16). At this juncture, the ignitron 20 diverts supply-current from both the hydrogen thyratron 26 and the protected devices 13 and 15. Thus, the comparatively slow-acting ignitron 20 functions to carry the brunt of fully discharging energy source 10 via resistance 14. Thus, the combination of a fast-acting hydrogen thryratron 26 and the slow-acting ignitron 20 can provide an effective fast-acting protection function in super-power systems.

A wide variety of devices can be protected against damage due to faulting by the novel means described herein. Circuitry in the right-hand portion of FIG. 1 is only one illustrative example. In this case, device 13 may be a tetrode vacuum tube used to control the flow of energy from terminal 12 (via resistances 14, 16 and 18) to load-resistance $R_L$ forming device 15. This control is effected by means of control-grid 36 and/or screen-grid 38. In event of a fault within device 13 (e.g., due to an internal flash-arc) control of the current flow will be lost and current will flow essentially unimpeded into load resistance $R_L$ device, resulting not only in damage to load control device 13 but also possibly to the load resistance device 15.

It is apparent that appropriate monitoring signals (e.g., samples of voltage and/or current) must be fed back from the protected device(s) 13, 15 to terminal 40 for use by the fault detection circuits 34 in making a continuous determination as to whether operation of the protected devices(s) is either normal or that a fault condition has developed. Fault detection circuits 34 usually take the form of electronic comparison means in which a sample of voltage (and/or current) taken from the protected device(s) 13 and 15 is compared with the magnitude(s) of reference voltage(s) (and/or currents) pre-established as maxima for normal operating conditions. The literature is replete with disclosures of electronic fault detection circuits, e.g., U.S. Pat. Nos. 2,575,232, 2,615,147, 2,928,026, 3,924,159, 2,815,446, 3,601,657 and the like. Those skilled in the art are also knowledgeable regarding the classical means of firing circuits 24 to respectively trigger hydrogen thyratron 26 via electrode 28 and ignitron 20 by igniter electrode 22. In fact, most of the aforelisted U.S. patents also show illustrative means for effecting the firing (triggering) of particular ignitron and thyratron devices, such as used with circuits 24.

It is apparent that the nature of the load $R_L$ device 15 can also take many forms. For example, in the case of the aforementioned control of the neutral beam injection to a nuclear fusion reactor, the load can take the form of high-voltage gating-grid in the beam-injection accelerator. $R_L$ device 15 may also be an inductor, auto-transformer, the primary of a transformer, a laser, a radio-frequency generator, or the like.

It is further apparent that the invention is not restricted to the use of single protective devices, as shown in FIG. 1. For example, if the B+ voltage at terminal 12 developed across energy source 10 exceeds the voltage-handling capabilities of either the ignitron 20, the hydrogen thyratron 26, or the load-control device 13, it is apparent that such devices can be serially connected in order to handle higher voltages. For example, two (or n) ignitrons, two (or n) thyratrons, or two (or n) load-control devices, can be serially connected as required by practical engineering considerations of voltage ratings.

Figure 2:
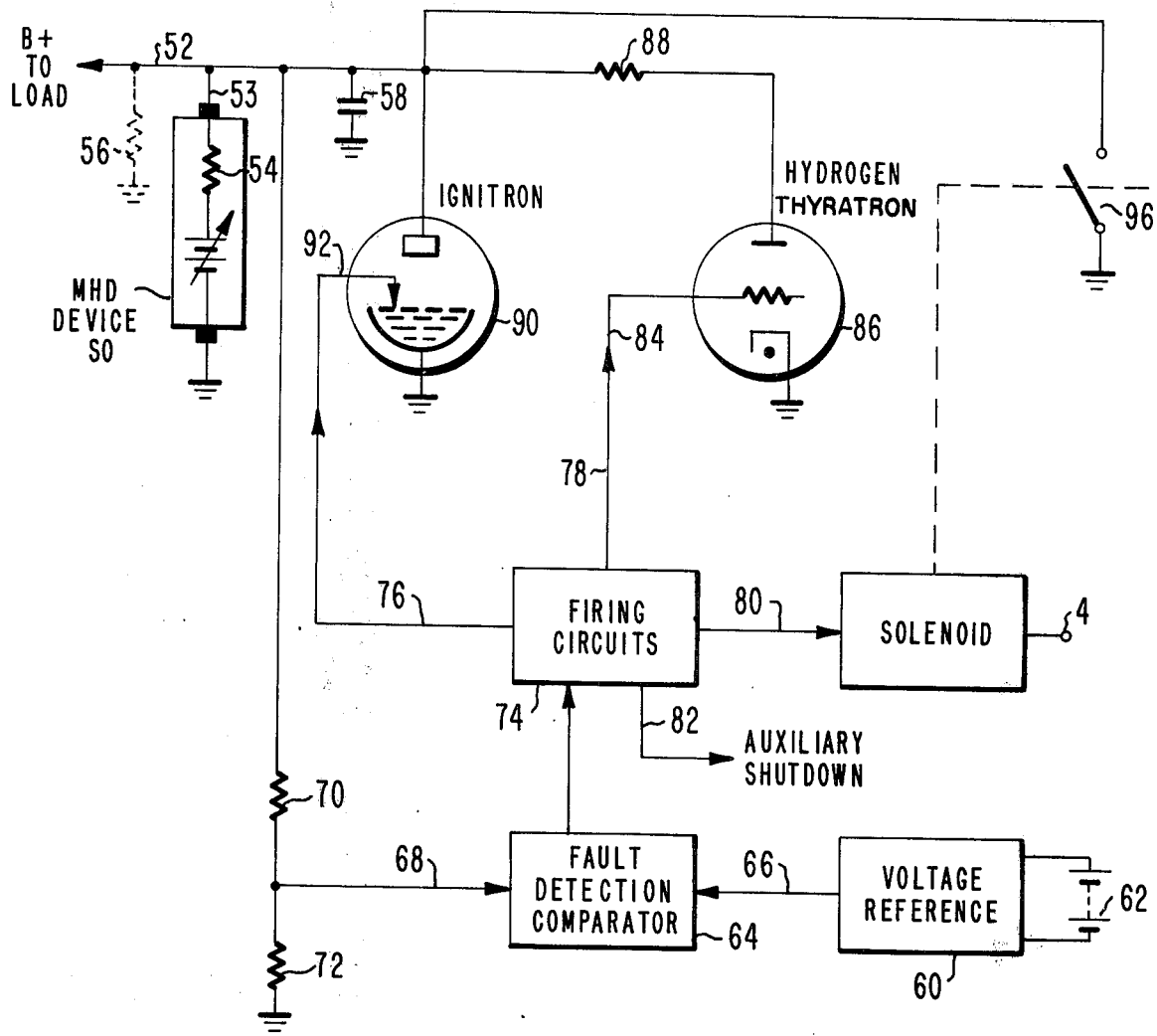
FIG. 2 is a circuit diagram illustrating a second embodiment of the invention.

The present invention also provides high speed protection against damage due to the occurrence of over-voltage as exemplified by the circuit of FIG. 2. For purposes of illustration, a magnetohydrodynamic (MHD) type of generator 50 appears as a source of energy to feed a B+ supply-bus 52 via lead 53. MHD power plants are described in U.S. Pat. No. 3,274,501, and one method of overvoltage protection is disclosed in U.S. Pat. No. 3,601,657.

An MHD generator is almost entirely resistive by nature, as depicted by resistance 54. Since it has little internal inductive or capacitive reactance, upon loss of a load 56 as by an open circuit either intentionally or accidentally, this type of generator will reach its open circuit voltages in a matter of microseconds, e.g., magnitudes approaching 100,000 volts. Such magnitudes of over-voltage in an MHD generator can give rise to arcing in the generator channel or duct, which internally "dumps" the energy being generated and causes serious damage.

A capacitor 58 of sufficient capacitance and voltage rating connected between bus 52 and ground is a classical means of providing a degree of overvoltage protection by limiting the rate of rise of voltage over a finite period. This method of protection is only partially effective. U.S. Pat. No. 3,601,657 discloses the use of an ignitron to shunt the B+ bus-energy to ground and inhibit the further development of overvoltage when the load 56 is lost. Since the shunting ignitron requires some period of microseconds to become fully conductive, it is apparent that the open-circuited generator voltage can continue to rise during the multi-microsecond period while the ignitron is becoming conductive. The invention disclosed herein provides an improved response time.

In the FIG. 2 circuit, stable voltage reference 60, shown as established by battery 62, serves to provide fault detection comparator 64 with a standard signal on lead 66 by which to make a determination whether sample potential on lead 68 is either a normal-voltage or an over-voltage. The sample voltage on lead 68 is derived from appropriate voltage-divider resistances 70 and 72, connected between the B+ bus 52 and ground. In event that load 56 is lost, the potential on bus 52 rises rapidly and causes the sample-voltage on lead 68 to rise sufficiently to actuate fault detection comparator 64. Comparator 64 thus triggers firing circuits 74 essentially simultaneously generating actuating signals on leads 76, 78, 80, and 82. The actuating signal on lead 78 drives the control-grid electrode 84 of hydrogen thyratron 86, driving it into conduction with a fractional microsecond so that it begins shunting high peak current via a comparatively low-valued resistance 88. This diverting current path restrains bus 52 voltage from further rise. At this time, very high-speed protection means have been activated. However, since by nature of its inherent characteristics of comparative electrical fragility, the hydrogen thyratron 86 is incapable of coping with the conduction of shunting current for the entire period needed to completely interrupt the MHD device 50. Consequently, it is necessary for ignitron 90 to be brought to full-conduction, its igniter 92 having been fired essentially simultaneously with the triggering of hydrogen thyratron 86. When ignitron 90 reaches full conduction (e.g., in a period of 5-10 microseconds, depending on its size, and other characteristics), current-flow out of bus 52 is diverted away from resistance 88 and hydrogen thyratron 86, thereby protecting thyratron 86 from damage due to current-flow for a period beyond its capabilities. Simultaneously with the triggering of ignitron 90 and thyratron 86, the firing circuits 74 also energize solenoid 94 which closes contacts 96 and provides a firm metallic (electrically conductive) path to shunt current out of bus 52 to ground, thereby ending conduction in ignitron 90. Even the fastest solenoid-actuated switches of the size required for such service require an elapsed time of many milliseconds to function after being energized. Simultaneously with the triggering of the ignitron 90, thyratron 86 and solenoid 94, the firing circuits 74 deliver a signal on lead 82 to auxiliary equipment (not shown) used in effecting shutdown of the MHD device 50, for example, relays and interlocks to cut-off fuel, seed and the like. It is now apparent that in certain practical electronic systems over-voltage transients can appear on the B+ bus 12, FIG. 1, thereby potentially inducing electrical faulting in devices 13, 15 and related circuitry. Such a system of protection against over-voltage transients can be implemented simply by installing a voltage-divider network like resistances 70 and 72, FIG. 2, into the circuit of FIG. 1 (connected between terminal 12 and ground). Such a network supplies a monitoring voltage-sample to trip firing circuits 24, thereby initiating the protective function already described in connection with FIG. 1.

What is claimed is:

1. A high voltage, high current protection apparatus comprising:
   a pair of terminals for receiving said high voltage and high current,
   ignitron tube means coupled between said terminals for short circuiting said terminals when said ignitron tube means is activated,
   fault sense means arranged to receive a fault signal from a device under protection; said sense means generating a protection firing signal in response to said received faults signal,
   hydrogen thyratron means coupled across said ignitron means for short circuiting said ignitron tube means when said thyratron means is activated, said thyratron means having a response time faster than the response time of said ignitron tube means, and
   means for applying simultaneously said protection firing signal to said ignitron means and thyratron means for activating said thyratron and ignitron means.

2. The apparatus of claim 1 wherein said thyratron means includes a plurality of thyratron tubes serially connected across said ignitron tube means, said means for applying said firing signal, applying said signal to each said thyratron tubes simultaneously.

3. A high voltage, high current protection apparatus comprising:
   a pair of input terminals,
   ignitron means for short circuiting said pair of input terminals,
   thyratron means coupled across said ignitron means for short circuiting said ignitron means and having a faster response time than said ignitron means,
   a pair of output terminals for connection to a device to be protected, and
   fault sense means connected to said ignitron means and thyratron means and one of said output terminals for triggering said ignitron and thyratron means simultaneously in response to a fault condition at said one output terminal.

* * * * *